US010149215B2

(12) United States Patent
Wang

(10) Patent No.: US 10,149,215 B2
(45) Date of Patent: *Dec. 4, 2018

(54) NETWORK NODE AND METHODS FOR SELECTING ACCESS NODE FOR COMMUNICATIONS IN WIRELESS COMMUNICATION NETWORKS

(71) Applicant: Telefonaktiebolaget L M Ericsson (publ), Stockholm (SE)

(72) Inventor: Xiaohui Wang, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 28 days.

This patent is subject to a terminal disclaimer.

(21) Appl. No.: 15/070,734

(22) Filed: Mar. 15, 2016

(65) Prior Publication Data
US 2016/0198376 A1 Jul. 7, 2016

Related U.S. Application Data

(63) Continuation of application No. 14/131,952, filed as application No. PCT/EP2013/074491 on Nov. 22, 2013, now Pat. No. 9,319,978.

(51) Int. Cl.
  *H04W 36/08* (2009.01)
  *H04W 48/20* (2009.01)
  (Continued)

(52) U.S. Cl.
  CPC ....... *H04W 36/08* (2013.01); *H04W 36/0077* (2013.01); *H04W 36/22* (2013.01);
  (Continued)

(58) Field of Classification Search
  CPC ..... H04W 48/00; H04W 48/02; H04W 48/04; H04W 48/06; H04W 48/18; H04W 8/204;
  (Continued)

(56) References Cited

U.S. PATENT DOCUMENTS

2006/0126565 A1    6/2006 Shaheen
2011/0176430 A1    7/2011 Letterberg et al.
(Continued)

FOREIGN PATENT DOCUMENTS

EP    1895799 A1    3/2008
EP    2056639 A2    5/2009
(Continued)

OTHER PUBLICATIONS

Anand, S. V. et al. "Unified Protocol Stack Architecture for 4G Mobile Terminals to Support Multiple Radio Access Technologies." Wireless Telecommunications Symposium, Pomana, California, USA, Apr. 26, 2007, pp. 1-6, IEEE.
(Continued)

*Primary Examiner* — Feben Haile
(74) *Attorney, Agent, or Firm* — Coats & Bennett, PLLC

(57) ABSTRACT

An access point control node assists a wireless terminal to select an access node for a communication in a wireless communication network comprising a cellular network access node and a wireless local network access node. The access point control node communicates with the wireless terminal via one or both of the wireless local network access node and the cellular network access node, and establishes a state of a wireless local network unit in the wireless terminal. The access point control node also obtains at least one of a radio or load condition of each of the wireless local network access node and the cellular network access node, and determines which of the access nodes to use based on the established state of the wireless local network unit and the obtained conditions.

19 Claims, 4 Drawing Sheets

(51) Int. Cl.
*H04W 72/04* (2009.01)
*H04W 72/08* (2009.01)
*H04W 48/18* (2009.01)
*H04W 36/00* (2009.01)
*H04W 36/22* (2009.01)
*H04W 52/02* (2009.01)

(52) U.S. Cl.
CPC ........... *H04W 48/18* (2013.01); *H04W 48/20* (2013.01); *H04W 52/0235* (2013.01); *H04W 72/0486* (2013.01); *H04W 72/085* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(58) Field of Classification Search
CPC . H04W 52/00; H04W 52/02; H04W 52/0209; H04W 52/0212; H04W 52/0225; H04W 52/0251; H04W 36/08; H04W 36/0077; H04W 36/22; H04W 48/204; H04W 72/0486; H04W 72/085
See application file for complete search history.

(56) References Cited

U.S. PATENT DOCUMENTS

| | | | |
|---|---|---|---|
| 2011/0222523 | A1 | 9/2011 | Fu et al. |
| 2012/0315905 | A1 | 12/2012 | Zhu et al. |
| 2013/0088983 | A1 | 4/2013 | Pragada et al. |
| 2014/0064068 | A1 | 3/2014 | Horn et al. |
| 2014/0113631 | A1* | 4/2014 | Zhou ..................... H04W 72/10 455/436 |
| 2014/0274179 | A1* | 9/2014 | Zhu ..................... H04W 52/243 455/509 |

FOREIGN PATENT DOCUMENTS

| | | |
|---|---|---|
| EP | 2173135 A2 | 4/2010 |
| EP | 2056639 A3 | 5/2013 |
| WO | 2005060294 A1 | 6/2005 |
| WO | 2008127162 A1 | 10/2008 |

OTHER PUBLICATIONS

ETRI, "Analysis on requirement fulfilment of network selection solutions", 3GPP TSG-RAN WG2 #83, Barcelona, Spain, Aug. 19, 2013, pp. 1-5, R2-132485, 3GPP.

Huawei, et al., "Further clarifications on solution 3", 3GPP TSG-RAN WG2 #83, Barcelona, Spain, Aug. 19, 2013, pp. 1-6, R2-132780, 3GPP.

LG Electronics Inc., "Comparison of access network selection solutions", 3GPP TSG-RAN WG2 #82, Fukuoka, Japan, May 20, 2013, pp. 1-6, R2-132055, 3GPP.

New Postcom, "Consideration on WLAN scanning and power consumption", 3GPP TSG-RAN WG2 #82, Fukuoka, Japan, May 20, 2013, pp. 1-4, R2-131715, 3GPP.

* cited by examiner

NETWORK NODE AND METHODS FOR SELECTING ACCESS NODE FOR COMMUNICATIONS IN WIRELESS COMMUNICATION NETWORKS

RELATED APPLICATIONS

This application is a continuation of prior U.S. application Ser. No. 14/131,952, filed 10 Jan. 2014, which was the U.S. National stage of International Application No. PCT/EP2013/074491 filed on 22 Nov. 2013, the disclosures of all of which are incorporated by reference herein in their entirety.

TECHNICAL FIELD

Embodiments herein relate to a network node and methods therein. In particular, it relates to a method in a network node for assisting a wireless terminal to select an access node for communications in a wireless communication network.

BACKGROUND

Communication devices such as wireless terminals are also known as e.g. User Equipments (UE), mobile terminals and/or mobile stations. Wireless terminals are enabled to communicate wirelessly in a cellular communications network or wireless communication network/system, sometimes also referred to as a cellular radio system or cellular network. The communication may be performed e.g. between two wireless terminals, between a wireless terminal and a regular telephone and/or between a wireless terminal and a server via a Radio Access Network (RAN) and possibly one or more core networks, comprised within the cellular communications network.

Wireless terminals may further be referred to as mobile telephones, cellular telephones, laptops, tablet computers or phablets with wireless capability, just to mention some further examples. The wireless terminals in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", Base Transceiver Station (BTS), depending on the technology and terminology used. Hereafter, base stations in the cellular communications network is in general referred as cellular network access nodes, which comprising Second/Third Generation (2G/3G) network access nodes, 3G Long Term Evolution (LTE) network access nodes, Worldwide interoperability for Microwave Access (WiMAX) network access nodes, etc.

Nowadays, almost all wireless terminals are equipped with a wireless local network unit, such as a Wireless Local Area Network (WLAN) unit. A wireless local network which may be a part of a wireless communications network, provides a connection for a wireless terminal through an access point to the Internet usually with high bandwidth and low cost. It gives users of the wireless terminal the mobility to move around within a local coverage area and still be connected to the wireless local network. The access point in the wireless local network is referred hereafter as a wireless local network access node.

Rapid growth in data traffic driven by mobile applications on wireless terminals such as smart phones, tablets and the like has continued to strain the capacity of the wireless communications network. To provide the best experience for the users of the wireless terminal regarding quality of service, mobility, security, cost and speed etc., switching or handover between different access nodes, e.g. between a cellular access node and a wireless local network access node is usually performed.

The conventional way of going over from a cellular network, e.g. a $3^{rd}$ Generation Partnership Project (3GPP) network to a wireless local network, e.g. the WLAN is when the signal strength of a WLAN access node is higher than a predefined threshold. The problems of such an approach are possible degradation of the performance, Ping-Pong effect between the WLAN and 3GPP network access nodes, and negative impacts on other wireless terminals already connected to the WLAN. For example, when a wireless terminal enters into a public place, where the wireless local network access node has good radio condition, e.g. the signal strength is high, but there are many users already connected to the access node and have active sessions, handover to this access node will degrade the performance of the communications for this wireless terminal and have negative impacts on other users already connected to this access node. For another example, when a wireless terminal enters into an area where the signal strength of a wireless local network access node is around the predefined threshold. If the wireless terminal moves around, the signal strength will change between above or below the predefined threshold during a short time. This will consequently cause Ping-Pong effect between the cellular network access node and the wireless local network access node.

SUMMARY

Therefore, it is an object of embodiments herein to improve handover or handling procedure between cellular access nodes and wireless local network access nodes in a wireless communications network.

According to a first aspect of embodiments herein, the object is achieved by a method in a network node for assisting a wireless terminal to select an access node for a communication in a wireless communication network. The wireless communication network comprises a cellular network access node and a wireless local network access node. The network node establishes a state of a wireless local network unit in the wireless terminal. The network node further obtains information of a radio condition and/or a load condition of the respective wireless local network access node and cellular network access node. The network node then determines which access node to use out of the wireless local network access node and the cellular network access node for the communication, based on the established state of the wireless local network unit and the obtained radio condition and/or load condition of the respective wireless local network access node and cellular network access node.

According to a second aspect of embodiments herein, the object is achieved by a network node for assisting a wireless terminal to select an access node for a communication in a wireless communication network. The wireless communication network comprises a cellular network access node and a wireless local network access node. The network node comprises an establishing circuit configured to establish a state of a wireless local network unit in the wireless terminal. The network node further comprises an obtaining circuit configured to obtain information of a radio condition and/or a load condition of the respective wireless local network access node and cellular network access node. The network node further comprises a determining circuit configured to determine which access node to use out of the wireless local network access node and the cellular network access node for the communication, based on the established state of the wireless local network unit and the obtained radio condition and/or load condition of the respective wireless local network access node and cellular network access node.

Since the network node actively controls the state of the wireless local network unit in the wireless terminal, obtains information on the radio condition and load condition of the access nodes and then selects which access node to use based on these information, handover procedure between different access nodes is improved and more efficient compared to selecting the access node merely on the measurement reports on the radio condition. In addition, embodiments herein can be used for all wireless terminals with or without active sessions.

Thus, embodiments herein provide an improved handover or handling procedure between different access nodes for the wireless terminal in the wireless communications network.

BRIEF DESCRIPTION OF THE DRAWINGS

Examples of embodiments herein are described in more detail with reference to attached drawings in which.

DETAILED DESCRIPTION

As the wireless local network, e.g. the WLAN is more and more integrated into the cellular communication network, e.g. the 3GPP network, the cellular network access node and the wireless local network access node can both be controlled by a same centre unit, e.g. the network node herein, in the wireless communications network. The network node is connected or communicated to the cellular network access node as well as the wireless local network access node. The network node controls the state of a wireless local network unit in the wireless terminal and selects one of the access node to use for communications between the wireless terminal and the selected access node based on the radio condition and/or load condition of the respective wireless local network access node and cellular access node. Since the network node actively controls the state of the wireless local network unit and the selection is based on radio and/or load conditions of both access nodes, problems identified in the background, such as degradation of the performance, Ping-Pong effect and negative impacts on other wireless terminals can be mitigated, and the best experience is provided for the users.

Figure 1:
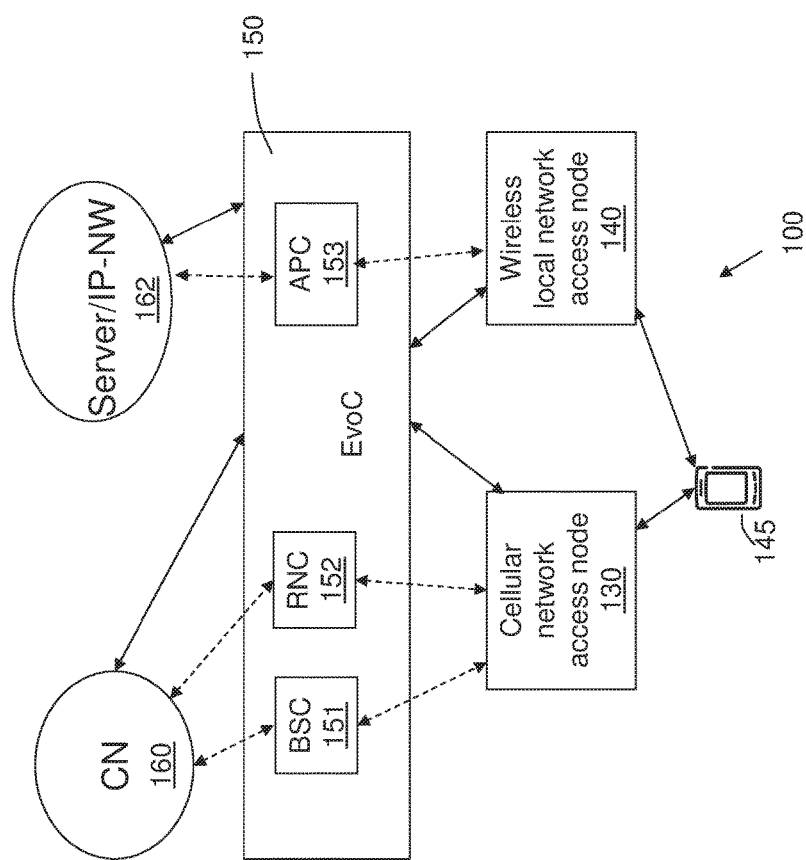
FIG. 1 is a schematic block diagram illustrating a wireless communications network in which embodiments herein may be implemented.

FIG. 1 depicts an example of a wireless communications network 100 in which embodiments herein may be implemented. The wireless communications network 100 comprises any cellular networks or system, such as GSM, GPRS, EDGE, WCDMA, UMTS, LTE and LTE Advanced networks etc., as well as Wimax, wireless local networks such as WLANs.

The wireless communications network 100 comprises a plurality of network access nodes whereof two, a cellular network access node 130 and a wireless local network access node 140 are depicted in FIG. 1. The cellular network access node 130 may be an eNB, an eNodeB, or an Home Node B, an Home eNode B or any other network node capable to serve a wireless terminal or a machine type communication device in a wireless communications network. The wireless local network access node 140 may e.g. be an WLAN access point provides a connection to the internet for a wireless terminal or a machine type communication device.

A wireless terminal 145 operates in the wireless communications network 100. The wireless terminal 145 may e.g. be a wireless device, a mobile wireless terminal, a mobile phone, a computer such as e.g. a laptop, a Personal Digital Assistants (PDAs) or a tablet computer, sometimes referred to as a surf plate, with wireless capability, or any other radio network units, such as a cellular unit, a wireless local network unit, capable to communicate over a radio link in a wireless communications network. As shown in FIG. 1, the wireless terminal 145 may communicate with the cellular network access node 130 and the wireless local network access node 140. Please note the term wireless terminal used in this document also covers other wireless devices such as Machine to machine (M2M) devices.

The wireless communications network 100 further comprises a network node 150, which may be referred to as an Evolved multiple Radio Access Technologies (RAT) controller, EvoC 150. The network node 150 may have the functions of any one or combined of a base station controller, BSC 151, a radio network controller, RNC 152, and an access point controller, APC 153 depicted in FIG. 1. The cellular network access node 130 may be connected to the BSC 151 or the RNC 152 as shown with dotted lines depending on which type the cellular network access node 130 is of. For example, if the cellular network access node is a 2G/3G network access node, it may be connected to the BSC 151; if the cellular network access node is a WCDMA access node, it may be connected to the RNC 152. The wireless local network access node may be connected to APC 154. The BSC 151 and RNC 152 may be connected to a Core Network, CN 160. The APC 154 may be connected to a Server or Internet Protocol (IP) network, Server/IP-NW 162. The network node EvoC 150 may be used as a controller for multi-standard, 3GPP or non-3GPP, access nodes and as well as a controller for wireless local network nodes.

All dotted lines shown in FIG. 1 indicate current interfaces between different nodes in the wireless communications network 100. As seen, the cellular network access node 130 and the wireless local network access node 140 are separated controlled by its own controller. If the handover from the cellular network access node 130 to the wireless local network access node 140 only relies on that the signal strength of the wireless local network access node 140 is higher than a predefined threshold without knowing the load condition of the wireless local network access node 140, it will cause problems as described in the background. To solve these problem, embodiments herein are based on that both the cellular network access node 130 and the wireless local network access node 140 can be controlled by the network node 150. That means the network node 150 may combine any functions of the BSC 151, the RNC 152 and the APC 154 and act as a handling unit or a controller for different Radio Access Technologies, such as a RAT Handling Unit (RATHU). The network node 150 further controls the wireless terminal 145 via different access nodes, provides interfaces between the cellular network access node 130 and the CN 160, as well as interfaces between the wireless local network access node 140 and the Server/IP-NW 162 as shown by the solid lines in FIG. 1.

Figure 2:
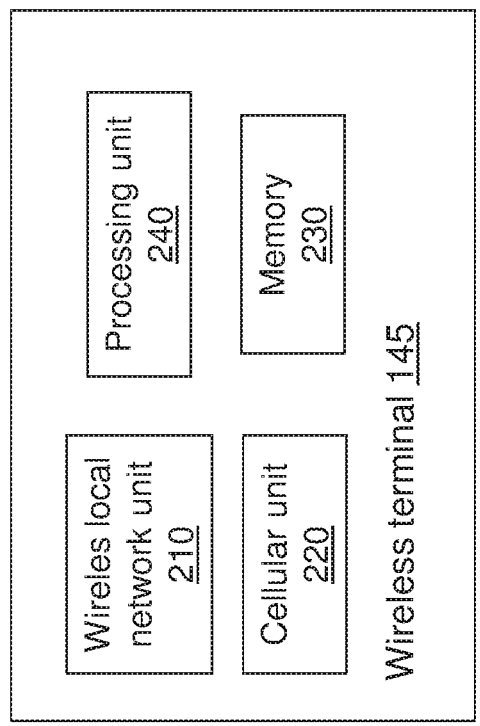
FIG. 2 is a schematic block diagram illustrating embodiments of a wireless terminal.

FIG. 2 depicts an example of the wireless terminal 145. The wireless terminal 145 comprises a wireless local network unit 210, a cellular unit 220, a memory 230 and a processing unit 240. The wireless local network unit 210 provides interfaces for the wireless terminal 145 to the wireless local network access node 140. The cellular unit 220 provides interfaces for the wireless terminal 145 to the cellular network access node 130.

Figure 3:
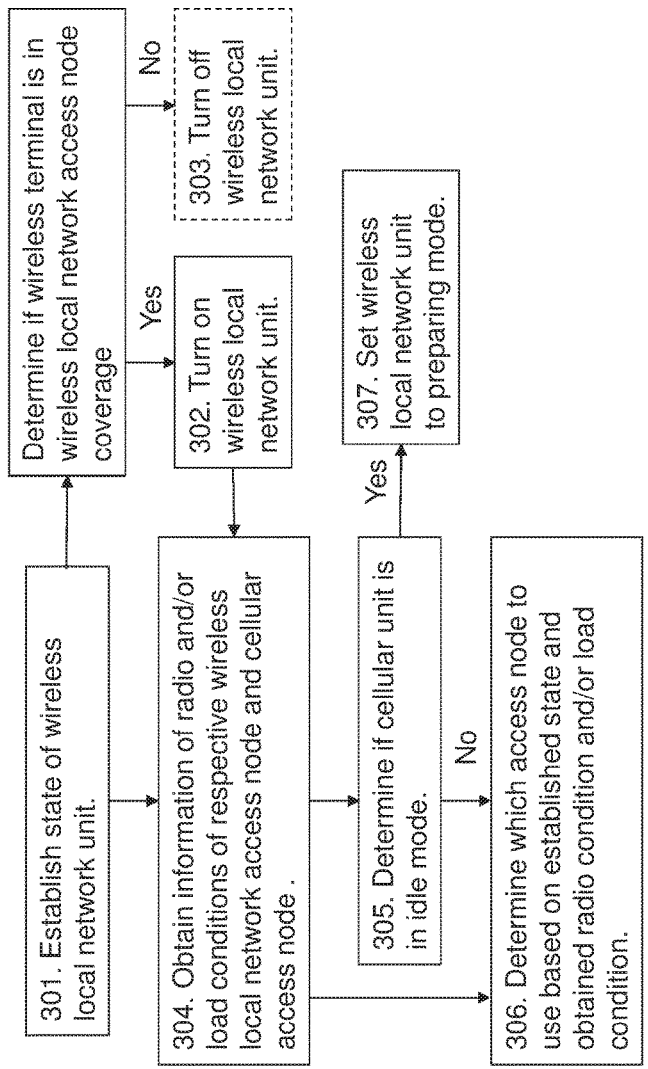
FIG. 3 is a flowchart depicting one embodiment of a method in a network node.

Example of embodiments of a method in the network node 150 for assisting the wireless terminal 145 to select an access node for a communication in a wireless communication network 100 will now be described with reference to FIG. 3. As mentioned above, the wireless communication network 100 comprises the cellular network access node 130 and the wireless local network access node 140. The method comprises the following actions, which actions may be taken in any suitable order. Dashed lines of one box in FIG. 3 indicate that this action is not mandatory.

Action 301

The network node 150 establishes a state of a wireless local network unit 210 in the wireless terminal 145. To be able to control the wireless local network unit 210, the network node 150 need to know the state of the wireless local network unit 210, such as whether the wireless local network unit 210 is on or off, whether the wireless local network unit 210 is in the coverage of a wireless local network access node.

Action 302

The network node 150 turns on the wireless local network unit 210 by sending a control signal to the wireless local network access node, if the wireless local network unit 210 is off when the wireless terminal 145 is in the wireless local network access node coverage. In this way, the network node 150 actively controls the wireless terminal 145 via the wireless local network access node. The control signal may be contained in a system information or broad cast information sent by the network node 150.

Action 303

This action is optional. In order to save the power of the wireless terminal and minimize it's interference to others, the network node 150 turns off the wireless local network unit 210 by sending a control signal to the wireless local network access node, if the wireless local network unit 210 is on when the wireless terminal 145 is not in the wireless local network access node coverage.

Action 304

To provide the best services for the users of the wireless terminal, the access node having good radio condition and less load should be chosen. Therefor the network node 150 needs to obtain information of a radio condition and/or a load condition of the respective wireless local network access node 140 and cellular network access node 130. In some embodiments, the network node 150 may only need to get the radio condition information for both access nodes. In some embodiments, the network node 150 may only need to get the load condition for both access nodes. In some embodiments, the network node 150 may need to get both radio condition and a load condition for both access nodes. The radio and load condition information is usually available from the measurement reports on the radio signal strength and the load for the access nodes. By merging the measurement reports of the radio conditions of the cellular network and the wireless local network, the load conditions of the access nodes are more accurate.

Action 305

In order to save power and not negatively impact other users in the wireless communication network, the network node 150 determines whether or not a cellular unit 220 in the wireless terminal 145 is in an idle mode and how the wireless local network unit 210 should behave accordingly for the following active mode Action 306 as well as preparing mode Action 307.

Action 306

The network node 150 determines which access node to use out of the wireless local network access node 140 and the cellular network access node 130 for the communication, based on the established state of the wireless local network unit 210 and the obtained radio condition and/or load condition of the respective wireless local network access node 140 and cellular network access node 130.

When the wireless terminal 145 is in active sessions, the network node 150 decides if the traffic to the wireless terminal 145 should be via the cellular network, e.g. a 3GPP network or switched to the wireless local network, e.g. a WLAN, for providing the user of the wireless terminal 145 with the best services depending on the measurement reports of the radio conditions between the wireless terminal 145 and the WLAN access node or the 3GPP network access node as well as their loads condition. The non-chosen one will only perform the measurement of its radio conditions and report it back to the network control node 150 via the chosen one so that the non-chosen one has no impacts on the load of its access node or its neighbors. Compared to the prior art approach, the access node selected by embodiments herein has better performance regarding to the radio condition and the load condition, thereby provides the best services.

In some embodiments, when there is more than one cellular network access node or more than one wireless local network access node, the network node 150 may determine which access node to use between the cellular network access nodes or between the wireless local network access nodes.

Action 307

The network node 150 sets the wireless local network unit 210 to a preparing mode by sending a control signal to the wireless local network access node, when the cellular unit 220 is in the idle mode and there are no active sessions. In this preparing mode the wireless local network unit 210 only performs measurement of radio conditions of the wireless local networks at predefined time instances. The network node 150 further sets the wireless local network unit 210 to comply with a time pattern of the cellular unit 220 in the wireless terminal 145 for monitoring the paging messages from the network node and performing the measurement and reporting to the network node during the time slots configured in the network node.

When the wireless terminal 145 enters an idle mode after active sessions or Routing (Tracking) Area Update etc., the network node 150 may set the wireless local network unit 210 to the preparing mode so that the power of the wireless terminal 145 will be saved and the negative impact on other wireless terminals already connected to the access node is avoided. Note that such a preparing mode for the wireless local network, e.g. the WLAN, is different from the optional power-saving mode defined in the WLAN Standard 802.11, where the wireless terminal has to wake up periodically to receive the beacon from the AP to see if there is downlink data available for it. This will consequently give false information on the load of the AP, especially when the wireless terminal is running active WLAN scanning schema.

Since the network node 150 actively controls the state of the wireless local network unit 210 in the wireless terminal 145, obtains information on the radio condition and load condition of access nodes and then selects which access node to use based on these information, handling procedure for different RAT access nodes is improved and more efficient compared to selecting the access node merely on the measurement reports on the radio condition. In addition, embodiments herein can be used for all wireless terminals with or without active sessions.

Figure 4:
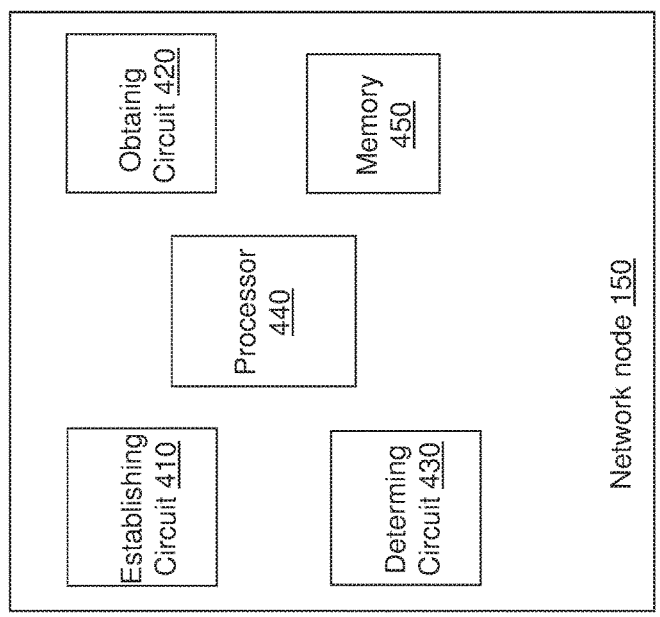
FIG. 4 is a schematic block diagram illustrating embodiments of a network node.

To perform the method actions in the network node 150 for assisting a wireless terminal 145 to select an access node for a communication in a wireless communication network 100, described above in relation to FIG. 3, the network node 150 comprises the following circuits depicted in FIG. 4. As mentioned above, the wireless communication network 100 comprises the cellular network access node 130 and the wireless local network access node 140.

The network node 150 comprises an establishing circuit 410 configured to establish a state of a wireless local network unit 210 in the wireless terminal 145.

In some embodiments, the establishing circuit 410 is further configured to determine whether or not the wireless terminal 145 is in a wireless local network access node coverage. The establishing circuit 410 may further be configured to turn on the wireless local network unit 210 if the wireless local network unit 210 is off when the wireless terminal 145 is in the wireless local network access node coverage; and to turn off the wireless local network unit 210 if the wireless local network unit is on when the wireless terminal 145 is not in the wireless local network access node coverage.

In some embodiments, the establishing circuit 410 is further configured to determine whether or not a cellular unit 220 in the wireless terminal 145 is in an idle mode. The establishing circuit 410 may further be configured to set the wireless local network unit 210 to a preparing mode when the cellular unit 220 is in the idle mode, and further set the wireless local network unit 210 to comply with a time pattern of the cellular unit 220 in the wireless terminal 145.

The network node 150 further comprises an obtaining circuit 420 configured to obtain information of a radio condition and/or a load condition of the respective wireless local network access node 140 and cellular network access node 130.

The network node 150 further comprises a determining circuit 430 configured to determine which access node to use out of the wireless local network access node 140 and the cellular network access node 130 for the communication, based on the established state of the wireless local network unit 210 and the obtained radio condition and/or load condition of the respective wireless local network access node 140 and cellular network access node 130.

Those skilled in the art will appreciate that establishing circuit 410, obtaining circuit 420 and determining circuit 430 described above may be referred to one circuit, a combination of analog and digital circuits, one or more processors, such as processor 440, depicted in FIG. 4, configured with software and/or firmware and/or any other digital hardware performing the function of each circuit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The network node 150 may further comprise a memory 450 comprising one or more memory units. The memory 450 is arranged to be used to store obtained information, such as measurements on radio condition and load condition, and other data, configurations to perform the methods herein when being executed in the network node 150.

The embodiments herein for assisting a wireless terminal 145 to select an access node for a communication in a wireless communication network 100 may be implemented through one or more processors, such as the processor 440 in the network node 150, together with computer program code for performing the functions and actions of the embodiments herein. The program code mentioned above may also be provided as a computer program product, for instance in the form of a data carrier carrying computer program code for performing the embodiments herein when being loaded into the network node 150. One such carrier may be in the form of a CD ROM disc. It is however feasible with other data carriers such as a memory stick. The computer program code may furthermore be provided as pure program code on a server and downloaded to the network node 150.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method, implemented by an access point control node, for assisting a wireless terminal to select an access node for a communication in a wireless communication network, the method comprising:
    interfacing, by the access point control node, with the wireless terminal via one or both of a wireless local network access node and a cellular network access node of the wireless communication network;
    establishing, by the access point control node, whether a power state of a wireless local network unit in the wireless terminal is on or off;
    obtaining, by the access point control node, at least one of a radio signal condition or load condition of each of the wireless local network access node and the cellular network access node;
    determining, by the access point control node, which access node to use out of the wireless local network access node and the cellular network access node for the communication, wherein the determining is based on the established power state of the wireless local network unit and the obtained conditions.

2. The method of claim 1, further comprising determining whether or not the wireless terminal is in a wireless local network access node coverage.

3. The method of claim 2, further comprising turning on the wireless local network unit in response to the wireless local network unit being off when the wireless terminal is in the wireless local network access node coverage.

4. The method of claim 2, further comprising turning off the wireless local network unit in response to the wireless local network unit being on when the wireless terminal is not in the wireless local network access node coverage.

5. The method of claim 1, further comprising:
determining whether or not a cellular unit in the wireless terminal is in an idle mode;
responsive to the cellular unit being in the idle mode, setting the wireless local network unit to a preparing mode.

6. The method of claim 5, wherein setting the wireless local network unit to the preparing mode comprises setting the wireless local network unit to comply with a time pattern of the cellular unit in the wireless terminal.

7. The method of claim 1, further comprising transmitting a control signal to the wireless terminal to modify an initial power state of the wireless local network unit to the established power state in advance of the determining of which access node to use for the communication.

8. The method of claim 1, further comprising transmitting a control signal to the wireless terminal to modify the established power state of the wireless local network unit based on the access node determined to be used for the communication.

9. The method of claim 1, further comprising:
transmitting a control signal to the wireless terminal to set the wireless terminal to a reduced-power mode after the wireless terminal has used the determined access node for the communication;
wherein the wireless local network unit only performs radio signal condition measurements at predefined time instances that comply with a time pattern for monitoring paging messages from the access point control node by a cellular unit in the wireless terminal while the wireless terminal is set to the reduced-power mode.

10. An access point control node for assisting a wireless terminal to select an access node for a communication in a wireless communication network, the access point control node comprising:
interface circuitry configured to interface with a wireless local network access node and a cellular network access node of the wireless communication network;
processing circuitry communicatively coupled to the interface circuitry and configured to:
interface with the wireless terminal via one or both of the wireless local network access node and the cellular network access node via the interface circuitry;
establish whether a power state of a wireless local network unit in the wireless terminal is on or off via the interface circuitry;
obtain at least one of a radio signal condition or load condition for each of a wireless local network access node and a cellular network access node of the wireless network via the interface circuitry;
determine which access node to use out of the wireless local network access node and the cellular network access node for the communication based on the established power state of the wireless local network unit and the obtained conditions.

11. The access point control node of claim 10, wherein the processing circuitry is further configured to determine whether or not the wireless terminal is in a wireless local network access node coverage via the interface circuitry.

12. The access point control node of claim 11, wherein the processing circuitry is further configured to, via the interface circuitry, turn on the wireless local network unit in response to the wireless local network unit being off when the wireless terminal is in the wireless local network access node coverage.

13. The access point control node of claim 11, wherein the processing circuitry is further configured to, via the interface circuitry, turn off the wireless local network unit in response to the wireless local network unit being on when the wireless terminal is not in the wireless local network access node coverage.

14. The access point control node of claim 10, wherein the processing circuitry is further configured to:
determine whether or not a cellular unit in the wireless terminal is in an idle mode via the interface circuitry;
responsive to the cellular unit being in the idle mode, set the wireless local network unit to a preparing mode via the interface circuitry.

15. The access point control node of claim 14, wherein to set the wireless local network unit to the preparing mode, the processing circuitry is configured to, via the interface circuitry, set the wireless local network unit to comply with a time pattern of the cellular unit in the wireless terminal.

16. The access point control node of claim 10, wherein the processing circuitry is further configured to transmit a control signal to the wireless terminal via the interface circuitry to modify an initial power state of the wireless local network unit to the established power state in advance of the determining of which access node to use for the communication.

17. The access point control node of claim 10, wherein the processing circuitry is further configured to transmit a control signal to the wireless terminal via the interface circuitry to modify the established power state of the wireless local network unit based on the access node determined to be used for the communication.

18. The access point controller of claim 10:
wherein the processing circuitry is further configured to transmit a control signal to the wireless terminal via the interface circuitry to set the wireless terminal to a reduced-power mode after the wireless terminal has used the determined access node for the communication;
wherein the wireless local network unit only performs radio signal condition measurements at predefined time instances that comply with a time pattern for monitoring paging messages from the access point control node by a cellular unit in the wireless terminal while the wireless terminal is set to the reduced-power mode.

19. A non-transitory computer readable medium storing a computer program product for controlling a programmable access point control node in a wireless communication network, wherein the computer program product, when executed by the programmable access point control node, causes the programmable access point control node to:
communicate with a wireless terminal via one or both of a wireless local network access node and a cellular network access node of the wireless communication network;
establish whether a power state of a wireless local network unit in the wireless terminal is on or off;
obtain at least one of a radio signal condition or load condition of each of the wireless local network access node and the cellular network access node;

determine which access node to use out of the wireless local network access node and the cellular network access node for a communication, wherein the determining is based on the established power state of the wireless local network unit and the obtained conditions.

* * * * *

UNITED STATES PATENT AND TRADEMARK OFFICE
CERTIFICATE OF CORRECTION

PATENT NO. : 10,149,215 B2  
APPLICATION NO. : 15/070734  
DATED : December 4, 2018  
INVENTOR(S) : Xiaohui Wang Page 1 of 1

It is certified that error appears in the above-identified patent and that said Letters Patent is hereby corrected as shown below:

On the Title Page

Item [56], under "OTHER PUBLICATIONS" in Column 2, Line 3, delete "Pomana," and insert -- Pomona, --, therefor.

In the Drawings

Fig. 2, Drawing Sheet 2 of 4, for Tag "210", in Line 1, delete "Wireles" and insert -- Wireless --, therefor.

Fig. 4, Drawing Sheet 4 of 4, for Tag "420", in Line 1, delete "Obtainig" and insert -- Obtaining --, therefor.

Fig. 4, Drawing Sheet 4 of 4, for Tag "430", in Line 1, delete "Determing" and insert -- Determining --, therefor.

In the Specification

Column 1, Line 9, delete "2014," and insert -- 2014, now Pat. No. 9,319,978, --, therefor.

Column 6, Line 36, delete "regarding to" and insert -- regarding --, therefor.

In the Claims

Column 10, Line 38, Claim 18, delete "controller" and insert -- control node --, therefor.

Signed and Sealed this  
Twenty-sixth Day of March, 2019

Andrei Iancu  
*Director of the United States Patent and Trademark Office*